Nov. 8, 1949   J. M. DOYLE   2,487,113
WINDSHIELD WIPER MOTOR
Filed Aug. 14, 1945   2 Sheets-Sheet 1
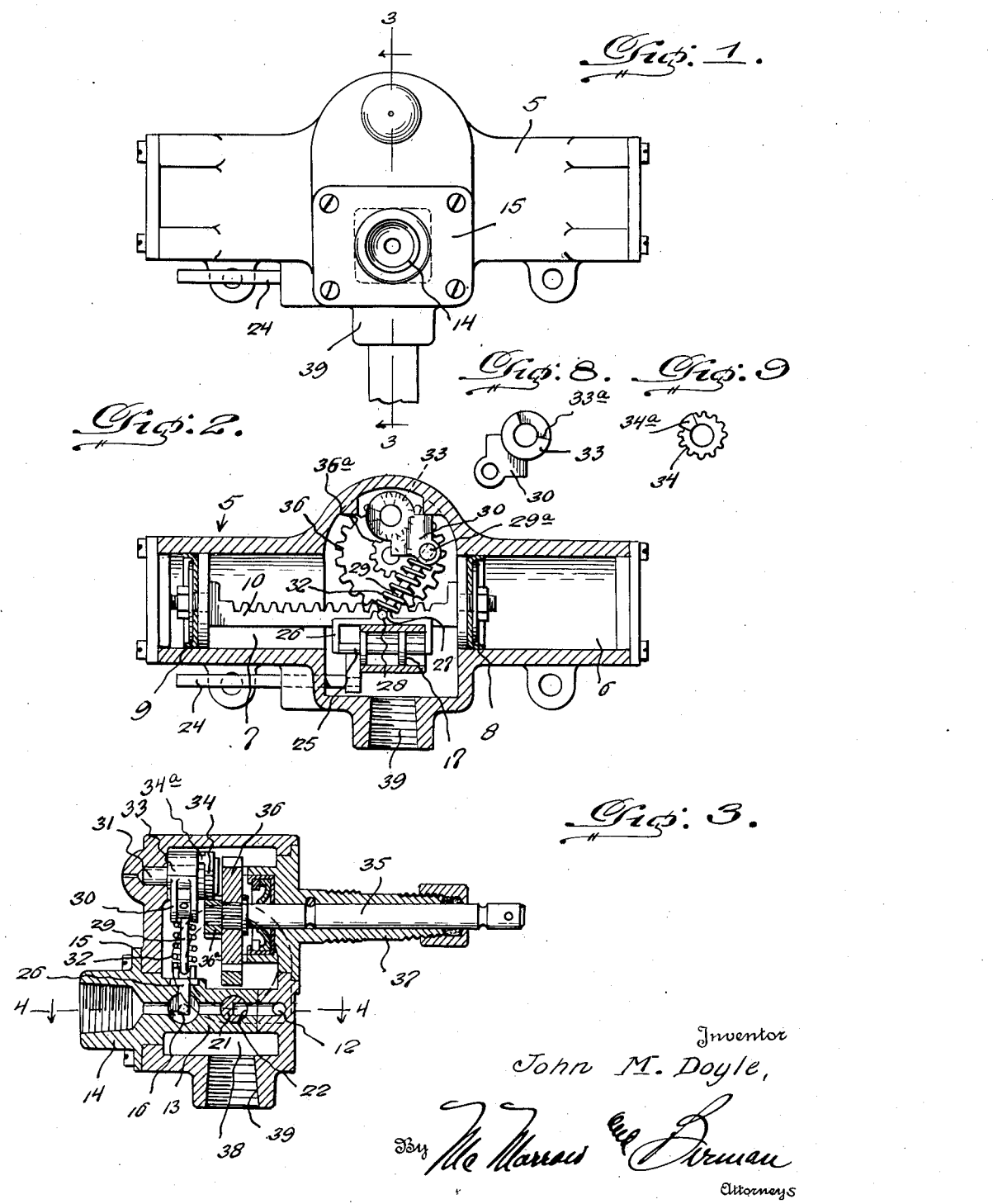
Inventor
John M. Doyle,

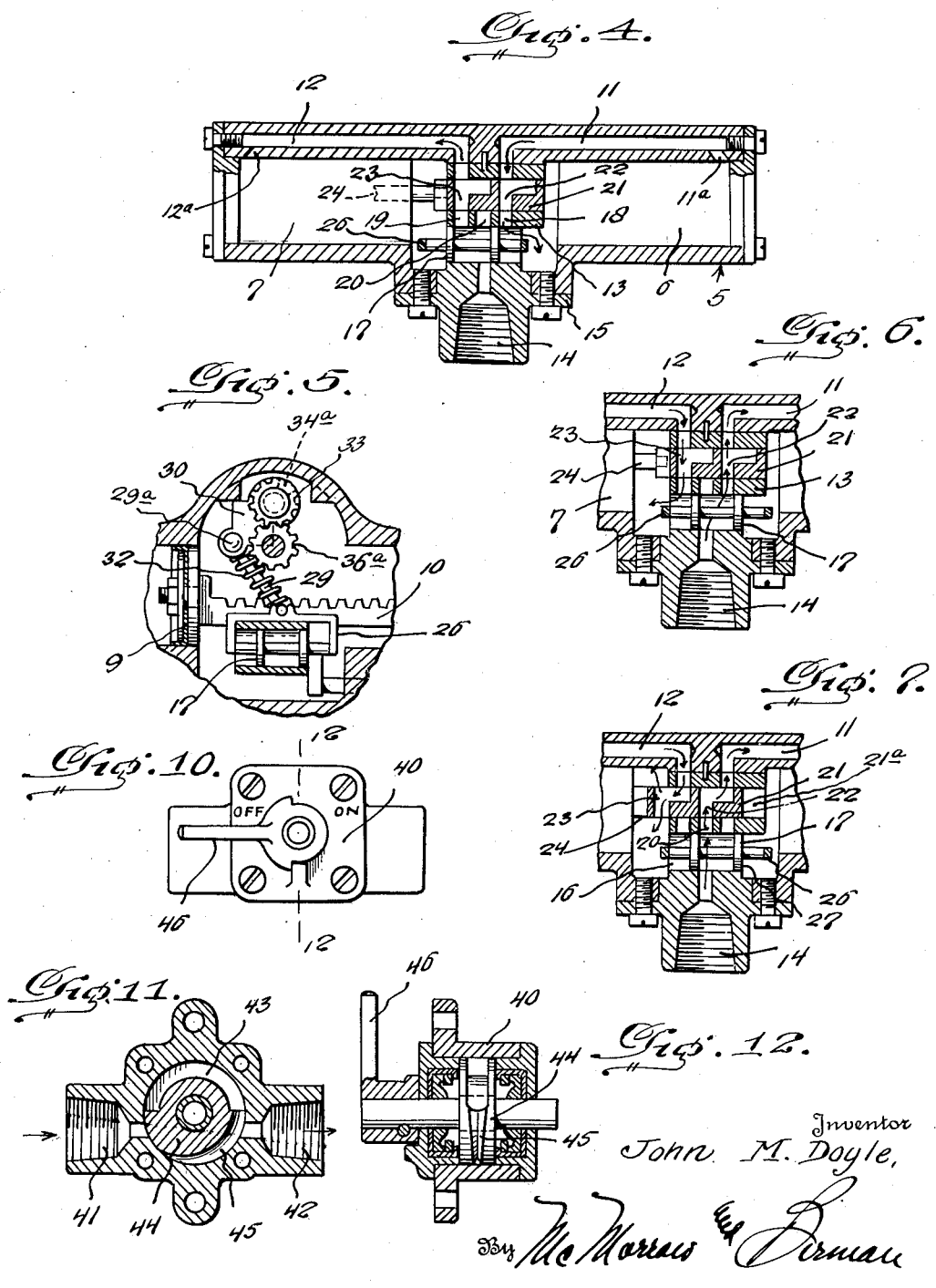

Patented Nov. 8, 1949

2,487,113

UNITED STATES PATENT OFFICE 2,487,113

WINDSHIELD WIPER MOTOR

John M. Doyle, Painesville, Ohio

Application August 14, 1945, Serial No. 610,698

3 Claims. (Cl. 121—164)

The present invention relates to new and useful improvements in windshield wipers for motor-driven vehicles, and more particularly to an oscillating wiping blade operated by fluid pressure from a so-called force-feed lubricating system of the engine.

The great majority of windshield wipers in use at the present time are operated by vacuum-actuated motors which impart an oscillating motion to a shaft which in turn drives the windshield cleaner arm. This type of windshield wiper is objectionable, due to the fact that its operation is dependent on vacuum created by the suction stroke of the engine which varies in accordance with certain operating conditions. Thus, upon opening the throttle, the intake manifold vacuum is reduced and the motor slows down or stops until proper vacuum conditions are restored in the manifold. Accordingly, the operation of the windshield wiper slows up when the engine is under heavy load.

It is accordingly an important object of the present invention to provide a fluid pressure operated windshield wiper which provides a substantially constant power output regardless of variations in vehicle speed or engine operating conditions.

More specifically, the invention embodies an oscillating wiper arm controlled by a double-acting piston subjected to pressure of fluid from the lubricating system of the engine together with novel valve-control means for oppositely actuating the piston upon completion of the stroke thereof, and also to provide valve-control means to secure the piston in inactive position.

A still further object of the invention is to provide a device of this character of simple and practical construction, which is efficient and reliable in operation, relatively inexpensive to manufacture and install in operative position on the vehicle, and which otherwise is well adapted for the purposes for which the same is intended.

Other objects and advantages reside in the details of construction and operation, as more fully hereinafter described and claimed, reference being had to the accompanying drawings forming part hereof, wherein like numerals refer to like parts throughout, and in which:

Figure 1 is a front elevational view of the motor housing for the wiper.

Figure 2 is a longitudinal sectional view thereof.

Figure 3 is a transverse sectional view taken substantially on a line 3—3 of Figure 1.

Figure 4 is a horizontal longitudinal sectional view, taken substantially on a line 4—4 of Figure 3, showing the passages in the housing communicating with the outer ends of the cylinders.

Figure 5 is a fragmentary sectional view showing the toggle operating mechanism for the control valve in a position for subjecting the right hand piston to the fluid pressure.

Figure 6 is an enlarged fragmentary sectional view of the valve when the toggle mechanism is in the position as shown in Figure 5.

Figure 7 is a similar view showing the cut-off valve for retaining the pistons in inactive positions.

Figure 8 is a detail of the oscillating toggle arm.

Figure 9 is a detail of the pinion for oscillating the toggle arm.

Figure 10 is a front elevational view of the cut-off valve for the fluid system.

Figure 11 is a longitudinal sectional view thereof.

Figure 12 is a transverse sectional view taken substantially on a line 12—12 of Figure 10.

Referring now to the drawings in detail, wherein for the purpose of illustration I have disclosed a preferred embodiment of the invention, the numeral 5 designates the motor housing generally for the windshield wiper and which includes right and left hand aligned cylinders 6 and 7 having pistons 8 and 9 working respectively therein and connected together for movement in unison by a rack bar 10.

Longitudinally extending passages 11 and 12 are formed in the housing at one side of the respective cylinders, the outer ends of the passages having ports 11a and 12a communicating with the cylinders at the outer ends of the respective pistons.

The inner ends of the passages 11 and 12 communicate with a valve housing 13 positioned at the center of the housing 5 and formed at the inner end of a nipple 14 secured in position at the lower front portion of the housing 5 by means of a flange 15, the nipple 14 being adapted for connection with the lubricating system of the engine and forming an intake for the fluid.

The forward portion of the valve housing 13 is formed with a transversely extending tubular chamber 16 in which a spool valve 17 is slidably mounted for controlling passage of the fluid through the housing 13 to the passages 11 and 12 by way of passages 18 and 19.

An intermediate passage 20 is also formed in the housing 13 between the passages 18 and 19 to also admit fluid to the passage 11 under control of a sliding valve 21 working in a transversely extending chamber 21a formed in the housing 13 behind the chamber 16, the valve 21 having passages 22 and 23 therein adapted to respectively provide communication between the passages 11 and 18 and with the passages 12 and 19, as indicated in Figure 4 of the drawings.

The valve 21 is movable to also register the intermediate passage 20 with either of the passages 22 and 23 to admit fluid to either of the passages 11 and 12, while the other of said passages is cut off.

The valve 21 is operated by means of a rod 24 projecting outwardly through the bottom of the housing 5 and adapted for manual operation by the driver of the vehicle.

The spool valve 17 includes a shaft 25 projecting outwardly at the opposite ends thereof and to the ends of which a yoke 26 is connected having a notch 27 in its upper portion in which is seated a pin 28 formed transversely at the lower end of a toggle rod 29. The upper end of the rod 29 is slidable transversely in a pin 29a pivoted in the lower end of an oscillating arm 30 journaled on a pin 31 having one end pressed in the front wall of the housing.

A coil spring 32 is mounted on the rod 29 between the pin 28 and the arm 30 to exert an upward pressure on the arm 30 and to snap the valve 17 in opposite directions in accordance with the oscillating movement of the arm 30 into either its right or left hand position, as shown in Figures 2 and 5 of the drawings.

The arm 30 is formed with a collar 33 having a notch 33a at one edge in which a lug 34a is engaged for limited movement, the lug being formed on one side of a pinion 34 also freely mounted on the pin 31. The pinion 34 is engaged by a small pinion 36a seamed on a shaft 35 at one side of a large pinion 36 which is also secured to said shaft and engages the rack 10.

The shaft 35 is journaled in a nipple 37 extending from the rear of the housing 5 and on the outer end of the shaft a hub for attaching the usual wiper arms is provided.

The motor housing 5 below the valve housing 13 is formed with a sump 38 in which the fluid is collected after acting on the piston and is returned to the lubricating system by way of a nipple 39 in the bottom of the housing 5.

A valve housing 40 is also included in the supply line leading to the intake 14, the valve housing 40 including inlet and outlet ports 41 and 42 communicating with a chamber 43 having a rotary valve 44 mounted therein and provided with a tapering groove 45 in its peripheral edge to regulate the volume of fluid passing through the housing 40. The valve 44 is provided with a manipulating handle 46 on the outside of the housing for moving the valve into its open and closed position, as indicated.

With the pistons 8 and 9 arranged in their extreme left hand position, as shown in Figure 2 of the drawings, the spool valve 17 will be moved toward the left, as indicated in Figure 4, whereby oil will be admitted through the passages 19 and 23 into the passage 12 behind the left hand piston 9 to move the piston toward the right and thus rotate the shaft 35 through the rack bar 10 and pinion 36.

Fluid in the cylinder 6 will then be discharged through the passage 11 and through the passages 18 and 22 to the sump 38 to return to the system.

As the pistons 8 and 9 move toward the right, the pinions 36 and 36a will be rotated counterclockwise and the lug 34a carried by the pinion 34 and engaged in the notch 33a of the collar 33 will swing the toggle arm 30 toward the left until the rod 29 reaches its vertical position and the spring 32 will then snap the toggle arm past center and thus move the spool valve 17 toward the right into the position as shown in Figure 6 of the drawings, whereby the fluid pressure will pass to the passage 11 behind the right hand piston, as shown by the arrows in Figure 6, and the fluid from the left hand cylinder will be discharged therefrom and returned to the system and the backward and forward movement of the piston is continued to cause the oscillation of the shaft 35 and the wiper arms carried thereby.

When it is desired to hold the wiper arms inactive, and presuming the device is in the position shown in Figure 4, oil is entering the left hand cylinder 7 to move the pistons 8 and 9 toward the right which turns the pinion 36 counter-clockwise and the arm 30 will swing from the position shown in Figure 2 to the left and will snap spool valve 17 to the right changing the indexing of input ports to 18, 22, 11 and 11a to enter the right hand cylinder 6.

Rod 24 is then moved manually to the left putting the shut-off valve 21 in the position shown in Figure 7. Oil will then continue to enter the right hand cylinder 6, as shown by the arrows, by way of the port 20 wherein the oil will move the pistons 8 and 9 to the extreme left. The travel of the piston will actuate the rack to operate the spool valve 17 which will snap to the left, but since port 19 has been closed by the valve 21, the flow is checked and the wiper is anchored in that position and at its extreme position.

When the rod 24 is again moved to the right, the port 19 is opened by valve 21 and oil may then enter the left hand cylinder 7 to operate the pistons.

The rod 24 for the sliding valve 21 may be moved at any point in the movement of the pistons to change the direction of the wiper. The flow control valve 44 will permit slowing the wiper down to any speed desired by indexing the tapering groove 45 with the inlet port 41 and thus increasing or retarding the flow of fluid into the cylinder.

It is believed that the details of construction, manner of use and advantages of the device will be readily understood from the foregoing without further detailed explanation.

It is to be understood, however, that even though I have herein shown and described a preferred embodiment of my invention, the same is susceptible of certain changes fully comprehended by the spirit of the invention as herein described, and the scope of the appended claims.

Having thus described the invention, what I claim is:

1. In a windshield motor, a housing, oppositely-positioned, aligned cylinders in said housing, a piston in each of said cylinders, a gear rack connecting sasid pistons together, a rotatable gear in said housing meshing with said rack and adapted to actuate a wiper carried by said gear, there being longitudinally-extending passages in said housing at one side of said cylinders for the reception of fluid therein, each of said passages having a port in communication with the cylinder complemental thereto, a chamber in said housing positioned below and forwardly of said passages providing an intake for the fluid, a tubular valve chamber in the forward portion of said chamber and provided with a pair of spaced passages arranged in registry with the inner ends of each of said longitudinally-extending passages, a valve mounted for slidable movement in said tubular chamber for controlling the flow of fluid through the registering passages, there being a passage in said tubular chamber intermediate the pair of spaced passages in the latter chamber, a second chamber in said housing arranged behind said tubular chamber, a second valve provided with a pair of spaced passages mounted for sliding movement in said second chamber, and means operatively connected to said second valve and actuable from without said housing for altering the flow of fluid through said registering passages in said longitudinally-extending passages and passages in said tubular valve chamber to thereby reverse the direction of travel of said wiper-actuating gear.

2. In a windshield motor, a housing, oppositely-positioned, aligned cylinders in said housing, a piston in each of said cylinders, a gear rack connecting said pistons together, a rotatable gear in said housing meshing with said rack and adapted to actuate a wiper carried by said gear, there being longitudinally-extending passages in said housing at one side of said cylinders for the reception of fluid therein, each of said passages having a port in communication with the cylinder complemental thereto, a chamber in said housing positioned below and forwardly of said passages providing an intake for the fluid, a tubular valve chamber in the forward portion of said chamber and provided with a pair of spaced passages arranged in registry with the inner ends of each of said longitudinally-extending passages, a valve mounted for slidable movement in said tubular chamber for controlling the flow of fluid through the registering passages, means operatively connected to said valve for automatically reversing the direction of movement of the latter, there being a passage in said tubular chamber intermediate the pair of spaced passages in the latter chamber, a second chamber in said housing and arranged behind said tubular chamber, a second valve provided with a pair of spaced passages mounted for sliding movement in said second chamber, and means operatively connected to said second valve and actuable from without said housing for altering the flow of fluid through said registering passages in said longitudinally-extending passages and passages in said tubular valve chamber to thereby reverse the direction of travel of said wiper-actuating gear.

3. In a windshield motor, a housing, oppositely-positioned, aligned cylinders in said housing, a piston in each of said cylinders, a gear rack connecting said pistons together, a rotatable gear in said housing meshing with said rack and adapted to actuate a wiper carried by said gear, there being longitudinally-extending passages in said housing at one side of said cylinders for the reception of fluid therein, each of said passages having a port in communication with the cylinder complemental thereto, a chamber in said housing positioned below and forwardly of said passages providing an intake for the fluid, a tubular valve chamber in the forward portion of said chamber and provided with a pair of spaced passages arranged in registry with the inner ends of each of said longitudinally-extending passages, a valve embodying a spool mounted for slidable movement in said tubular chamber for controlling the flow of fluid through the registering passages, toggle means operatively connected to said valve for automatically reversing the direction of movement of the latter, there being a passage in said tubular chamber intermediate the pair of spaced passages in the latter chamber, a second chamber in said housing and arranged behind said tubular chamber, a second valve provided with a pair of spaced passages mounted for sliding movement in said second chamber, and means operatively connected to said second valve and actuable from without said chamber for altering the flow of fluid through said registering passages in said longitudinally-extending passages and passages in said tubular valve chamber to thereby reverse the direction of travel of said wiper-actuating gear.

JOHN M. DOYLE.

REFERENCES CITED

The following references are of record in the file of this patent:

UNITED STATES PATENTS

| Number | Name | Date |
|---|---|---|
| 1,693,665 | Phillips | Dec. 4, 1928 |
| 1,913,308 | Hueber et al. | June 6, 1933 |
| 2,034,086 | Clima et al. | Mar. 17, 1936 |
| 2,060,684 | Moorhouse | Nov. 10, 1936 |
| 2,098,936 | Armstrong et al. | Nov. 16, 1937 |
| 2,310,750 | Schnell | Feb. 9, 1943 |